(12) United States Patent
Kawanaka et al.

(10) Patent No.: US 8,543,908 B2
(45) Date of Patent: Sep. 24, 2013

(54) AIDING IN CREATING, EXTENDING, AND VERIFYING ACCESSIBILITY METADATA

(75) Inventors: Shinya Kawanaka, Kanagawa (JP); Masatomo Kobayashi, Kanagawa (JP); Daisuke Sato, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 12/825,317

(22) Filed: Jun. 28, 2010

(65) Prior Publication Data

US 2011/0016359 A1 Jan. 20, 2011

(30) Foreign Application Priority Data

Jul. 16, 2009 (JP) ................ 2009-168195

(51) Int. Cl.
*G06F 17/00* (2006.01)
(52) U.S. Cl.
USPC ............ 715/234; 715/243; 715/249; 715/250
(58) Field of Classification Search
USPC ......................... 715/249, 243, 248
See application file for complete search history.

(56) References Cited

U.S. PATENT DOCUMENTS

| | | | | |
|---|---|---|---|---|
| 6,714,963 B1 * | 3/2004 | Levine et al. | | 709/203 |
| 7,383,496 B2 * | 6/2008 | Fukuda | | 715/230 |
| 7,401,079 B2 | 7/2008 | Itoh et al. | | |
| 7,448,023 B2 * | 11/2008 | Chory et al. | | 717/124 |
| 7,657,832 B1 * | 2/2010 | Lin | | 715/234 |
| 7,689,873 B1 * | 3/2010 | Bennett | | 714/48 |
| 8,090,800 B2 * | 1/2012 | Yee | | 709/219 |
| 8,331,739 B1 * | 12/2012 | Abdulkader et al. | | 382/311 |
| 2003/0018668 A1 * | 1/2003 | Britton et al. | | 707/513 |
| 2003/0065645 A1 | 4/2003 | Itoh et al. | | |
| 2004/0148568 A1 * | 7/2004 | Springer | | 715/513 |
| 2009/0019073 A1 | 1/2009 | Itoh et al. | | |

FOREIGN PATENT DOCUMENTS

| | | |
|---|---|---|
| JP | 2003085087 A | 3/2003 |
| JP | 2004014594 A | 1/2004 |
| JP | 2008305356 A | 12/2008 |
| JP | 2009070079 A | 4/2009 |
| JP | 2009122881 A | 6/2009 |

OTHER PUBLICATIONS

IDS Report, Jan. 25, 2012, from the Jan. 23, 2012 Notice of Allowance for JP920090046JP1, Total 2 pp.
English Abstract and Machine Translation for JP2008305356A, published Dec. 18, 2008, Total 32 pp.
English Abstract and Machine Translation for JP2009070079A, published Apr. 2, 2009, Total 30 pp.
English Abstract and Machine Translation for JP2009122881A, published Jun. 4, 2009, Total 28 pp.

(Continued)

*Primary Examiner* — Cesar Paula
*Assistant Examiner* — Howard Cortes
(74) *Attorney, Agent, or Firm* — Janaki K. Davda; Konrad, Raynes, Davda & Victor LLP

(57) ABSTRACT

Degrees of similarity between pages from the viewpoint of metadata creation and verification can be estimated based on degrees of similarity between pages in terms of structure, style (appearance), and accessibility error, and, based on the estimation, representative pages appropriate for efficiently adding metadata can be recommended, or target pages appropriate for efficiently verifying the metadata can be recommended.

21 Claims, 13 Drawing Sheets

(56) References Cited

OTHER PUBLICATIONS

English Abstract for Publication No. JP2003085087, published on Mar. 20, 2003, 1 pg.

English Abstract and Translation for Publication No. JP2004014594, published on Jan. 15, 2004, 21 pp.

Takagi, H., S. Kawanaka, M. Kobayashi, T. Itoh, and C. Asakawa, "Social Accessibility: Achieving Accessibility through Collaborative Metadata Authoring", Proceedings of the 10th international ACM SIGACCESS Conference on Computers and Accessibility, 2008, 8 pp.

* cited by examiner

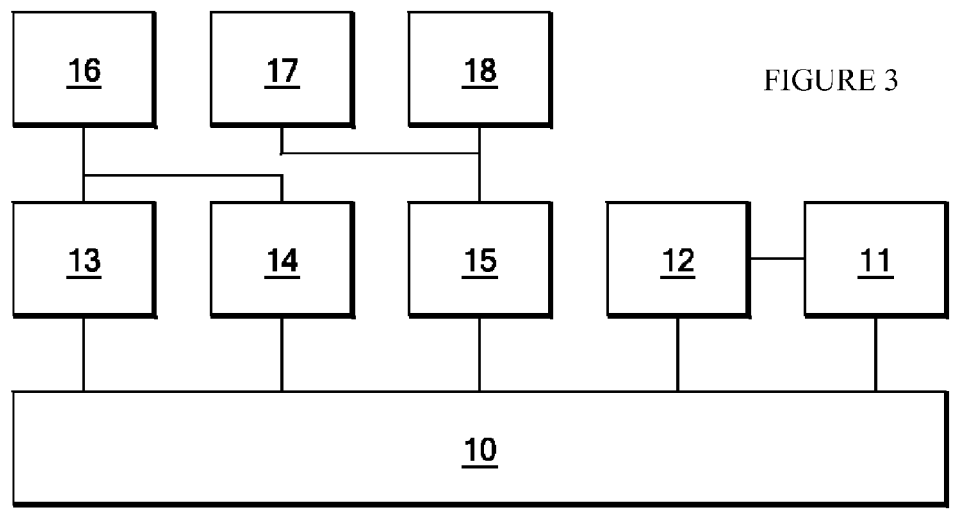
FIGURE 3
FIGURE 4
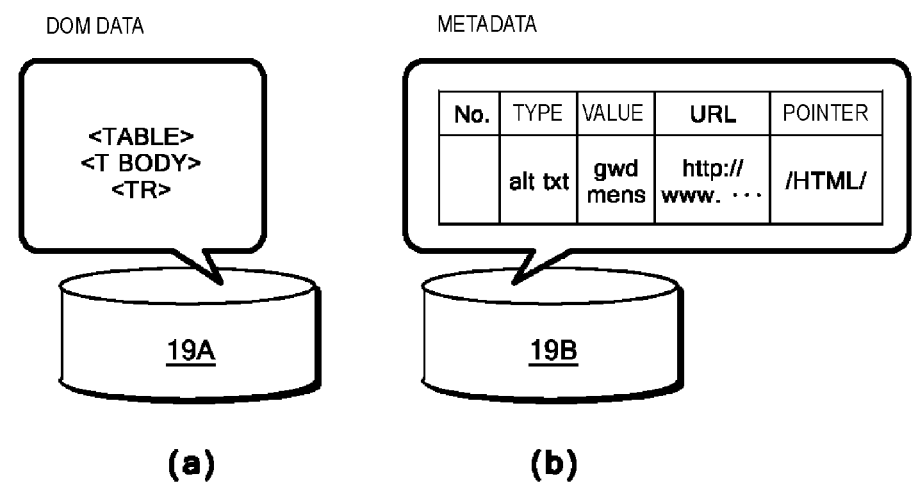
(a)       (b)

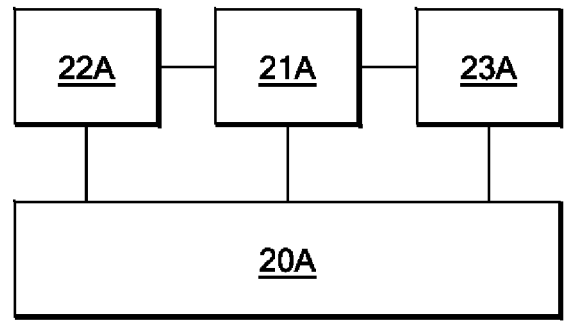
(a)
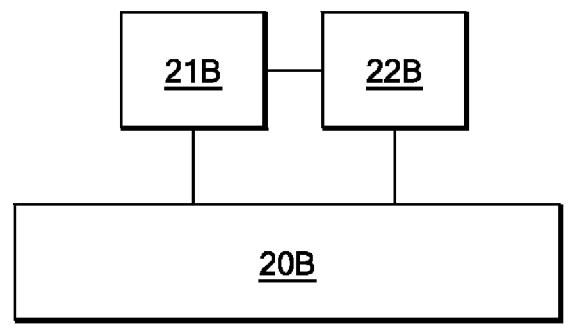
(b)
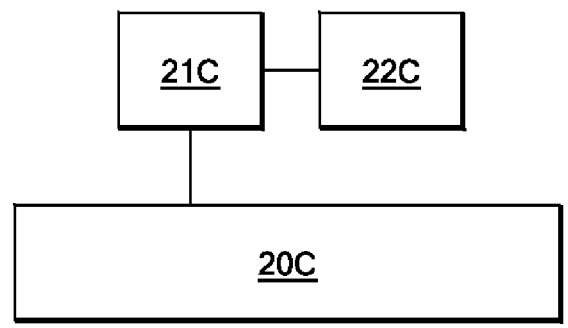
(c)
FIGURE 5

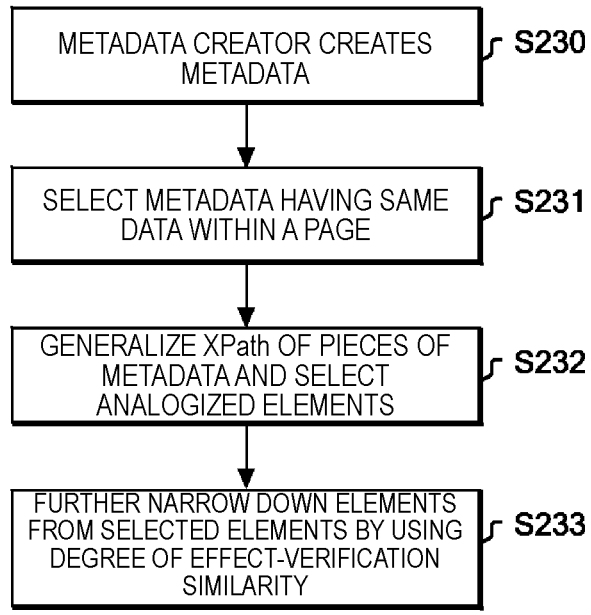
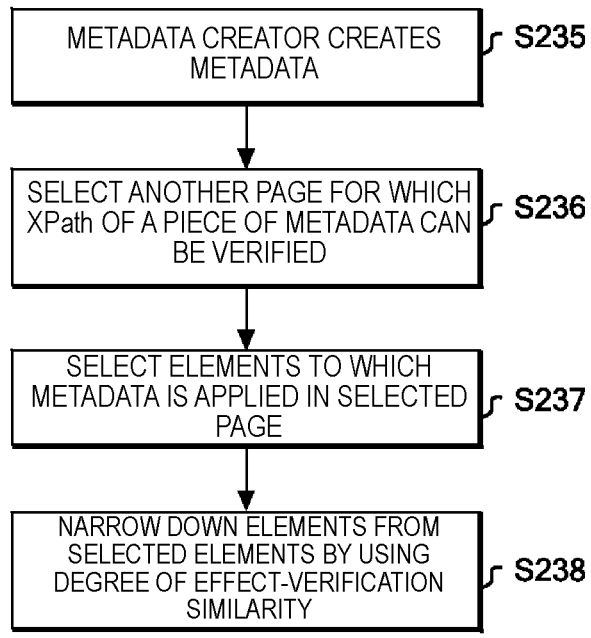
FIGURE 8

|  | s | s' | $w_p$ |
|---|---|---|---|
| front-size | 14px, 14px | 18px, 18px | 0.3 |
| front-family | Arial, Arial | Times, Times | 0.3 |
| width | 20px, 20px | 30px, 30px | 0.1 |
| height | 20px, 20px | 20px, 20px | 0.1 |
| text-decoration | under-line, none | none, none | 0.1 |
| border-with | 0px, 0px | 1px, 1px | 0.1 | s("front-size", "14pt") = 2
s'("front-size", "18pt") = 1
s'("front-size", "14pt") = 1

$$ssim = \frac{2\times1+0\times1}{2\times\sqrt{2}}\times0.3 + \frac{2\times0+0\times2}{2\times2}\times0.3 + \frac{2\times0+0\times2}{2\times2}\times0.1 + \frac{2\times2}{2\times2}$$

$$\times0.1 + \frac{1\times0+1\times2}{\sqrt{2}\times2}\times0.1 + \frac{2\times0+0\times2}{2\times2}\times0.1 = 0.38$$

FIGURE 10

- FIVE PAGES (a - e)
  - psim: DEGREE OF SIMILARITY OF PROBLEM POINTS AND
  - es: ERROR SCORE ARE ALREADY CALCULATED

| psim() | a   | b   | c   | d   | e   |
|--------|-----|-----|-----|-----|-----|
| a      | 1.0 | 0.9 | 0.4 | 0.9 | 0.1 |
| b      |     | 1.0 | 0.4 | 0.9 | 0.1 |
| c      |     |     | 1.0 | 0.4 | 0.7 |
| d      |     |     |     | 1.0 | 0.1 |
| e      |     |     |     |     | 1.0 |

INITIAL STATE

|      | a   | b   | c   | d   | e   |
|------|-----|-----|-----|-----|-----|
| es() | 0.9 | 0.7 | 0.8 | 0.7 | 0.5 |

- cond(a) =
  psim(a,a)*es(a)+psim(a,b)*es(b)+psim(a,c)*es(c)+psim(a,d)*es(d)+psim(a,e)*es(e) =
  1.0*0.9+0.9*0.7+0.4*0.8+0.9*0.7+0.1*0.5
  = 2.53

|        | a    | b    | c    | d    | e    |
|--------|------|------|------|------|------|
| cond() | 2.53 | 2.51 | 2.07 | 2.51 | 1.29 |

UPDATED

|      | a | b    | c    | d    | e    |
|------|---|------|------|------|------|
| es() | 0 | 0.07 | 0.48 | 0.07 | 0.45 |

- es(b) <- es(b)-psim(a,b)*es(b) =
  0.7-0.9*0.7 = 0.07

|        | a | b    | c     | d    | e   |
|--------|---|------|-------|------|-----|
| cond() | — | 0.37 | 0.851 | 0.37 | 0.8 |

FIGURE 12

AIDING IN CREATING, EXTENDING, AND VERIFYING ACCESSIBILITY METADATA

CROSS-REFERENCE TO RELATED FOREIGN APPLICATION

This application is a non-provisional application that claims priority benefits under Title 35, Unites States Code, Section 119(a)-(d) or Section 365(b) of Japanese Patent Application No. 2009-168195, filed on Jul. 16, 2009, by Shinya Kawanaka, Masatomo Kobayashi, and Daisuke Sato, which application is incorporated herein by reference in its entirety.

FIELD OF THE INVENTION

The present invention relates to information processing techniques, and more particularly to methods for aiding a user in creating, extending, and verifying metadata for correcting accessibility defects in a website.

BACKGROUND OF THE INVENTION

Websites need to be accessibility-conscious for ease of use for people such as the visually impaired, so that some countries and international organizations specify official standards. Conventionally, to improve the accessibility of low-accessibility web pages, the pages themselves need to be modified. However, it is known that the accessibility improvement cost can be significantly reduced by dynamically modifying, with external metadata (hereinafter simply referred to as metadata), DOM of pages being viewed on a browser. This metadata is generally enabled for a plurality of pages by expressing, using a regular expression, a pattern representing URLs of content to which the metadata is applied. As a result, the application range of the metadata can be extended to reduce the number of pieces of metadata to be created. In another instance, when a new page is added, any existing metadata that is applicable can be used to improve the accessibility of the page without creating new metadata.

Generally, creating and managing metadata for a website takes the following procedure. (1) The website is crawled. (2) DOM of obtained pages is analyzed. (3) Based on the result, a metadata creator creates metadata for an arbitrary page. (4) The metadata is extended to be applicable to a plurality of pages with the aid of a tool. (5) The accessibility of each resulting page with the metadata applied thereto is verified. (6) The metadata is actually distributed to visually impaired people. Published Unexamined Patent Application No. 2003-85087 and Published Unexamined Patent Application No. 2004-14594 disclose prior art of aiding in this metadata creation and extension. The Published Unexamined Patent Application No. 2003-85087 allows automatically generating the metadata application range by analyzing the layout of a page and by generating a normal expression of URLs corresponding to pages with similar layouts. The Published Unexamined Patent Application No. 2004-14594 allows aiding in checking and editing the metadata application range by using a UI that provides a list indicating which piece of created metadata is applied to which page.

However, the conventional techniques have the following problems with the steps (3), (4), and (5). That is, in the step (3), the metadata creator arbitrarily chooses a page for which the metadata is to be created. If several persons simultaneously create the metadata, the respective metadata application ranges may overlap each other in (4) and overlapping pieces of metadata may be created in the entire website, resulting in inefficient metadata creation. Also in the step (4), the technique of the Published Unexamined Patent Application No. 2003-85087 allows extending the metadata to pages with similar layouts, and the user interface of the Published Unexamined Patent Application No. 2004-14594 allows viewing a list indicating to which page each piece of metadata is applied. However, these techniques do not take into account whether each piece of extended metadata is applied as intended. Therefore, the metadata creator cannot know information such as a high likelihood of inappropriate metadata application. Furthermore, in the step (5), the conventional techniques do not take verification into account as to whether the accessibility of pages with the created metadata applied thereto has actually improved. Since verifying all pages is not realistic, some pages may be chosen and verified. However, if a verifier chooses and verifies arbitrary pages, the verifier may leave some metadata unverified or miss verifying pages likely to have metadata incorrectly applied thereto. Thus the effectiveness of the metadata cannot be efficiently verified.

SUMMARY OF THE INVENTION

The present invention has been made to solve the above technical problems, and an object of the present invention is to provide methods by which degrees of similarity between pages from the viewpoint of metadata creation and verification can be estimated based on degrees of similarity between pages in terms of structure, style (appearance), and accessibility error, and based on the estimation, representative pages appropriate for efficiently adding metadata can be recommended, or target pages appropriate for efficiently verifying the metadata can be recommended.

To solve the above problems, the present invention can employ the following configuration. That is, to select defects providing higher correction effect, the present invention can employ a method implemented by a computer system having I/O means, calculation control means, and storage means, the method aiding in correcting defects included in structured text, including: calculating a degree of defect for each of the defects; calculating a degree of similarity for each of the defects; calculating, based on the degree of defect and the degree of similarity, a degree of contribution indicating a degree to which correction of each defect influences correction of the remaining defects; and selecting a defect higher in the degree of contribution as a higher-priority defect.

Also, to perform more appropriate extension of corrections, the present invention can employ a method implemented by a computer system having I/O means, calculation control means, and storage means, the method aiding in correcting defects included in structured text, including: receiving an input of a correction for a defect; calculating a degree of similarity between the defect and the remaining defects; calculating, based on the degree of similarity, a degree of confidence indicating a degree as to whether or not the correction is applicable to the remaining defects; and selecting the correction as a correction candidate for defects having the degree of confidence equal to or higher than a threshold.

Furthermore, to select corrections providing higher verification effect, the present invention can employ a method implemented by a computer system having I/O means, calculation control means, and storage means, the method aiding in verifying corrections included in structured text, including: calculating a degree of verification indicating a degree to which each of the corrections have been verified; calculating a degree of similarity for the corrections; calculating, based on the degree of similarity, a degree of verification contribution indicating a degree to which verification of a correction influences verification of the remaining corrections; and selecting a correction higher in the degree of verification contribution as a higher-priority correction.

While the summary of the present invention has been described above as computer system-implemented methods, the present invention can also be conceived as a computer system, a program, or a program product. Program products can include a storage medium having stored the program thereon, or a medium transmitting the program.

For example, to select defects providing higher correction effect, the present invention can also be conceived as a computer system having I/O means, calculation control means, and storage means, wherein the calculation control means calculates a degree of defect for each of the defects; calculates a degree of similarity for each of the defects; calculates, based on the degree of defect and the degree of similarity, a degree of contribution indicating a degree to which correction of each defect influences correction of the remaining defects; and selects a defect higher in the degree of contribution as a higher-priority defect. Similarly, the present invention can also be conceived as a computer program that causes a computer system having I/O means, calculation control means, and storage means to perform: calculating a degree of defect for each of the defects; calculating a degree of similarity for each of the defects; calculating, based on the degree of defect and the degree of similarity, a degree of contribution indicating a degree to which correction of each defect influences correction of the remaining defects; and selecting a defect higher in the degree of contribution as a higher-priority defect.

It is to be noted that the above summary of the invention is not a complete list of all essential features of the present invention, and combinations or subcombinations of the above elements can also constitute the present invention.

BRIEF DESCRIPTION OF THE DRAWINGS

FIG. 3 is a functional block diagram describing part of software functions of the accessibility server 1;

FIG. 4 is a diagram describing part of data maintained in the accessibility server 1;

FIG. 5 is a functional block diagram describing part of software functions of each of user terminals 2A to C;

FIG. 8 is flowcharts describing in more detail a process of extending the metadata;

FIG. 10 is a diagram showing a specific example of calculating ssim(s,s');

FIG. 12 is a diagram showing an example of calculating the degree of correction contribution and selecting correction candidates;

DETAILED DESCRIPTION OF THE DRAWINGS

Now, the best mode for implementing the present invention will be described in detail below based on the drawings. However, embodiments below are not intended to limit the invention set forth in the claims, and not all combinations of features described in the embodiments are essential for the solution of the invention.

The present invention can be implemented in many different aspects and should not to be interpreted only within the description of the embodiments. It is to be noted that not all combinations of features described in the embodiments are essential for the solution of the invention. Throughout the description of the embodiments, like elements are given like numbers (unless otherwise stated).

Figure 1:
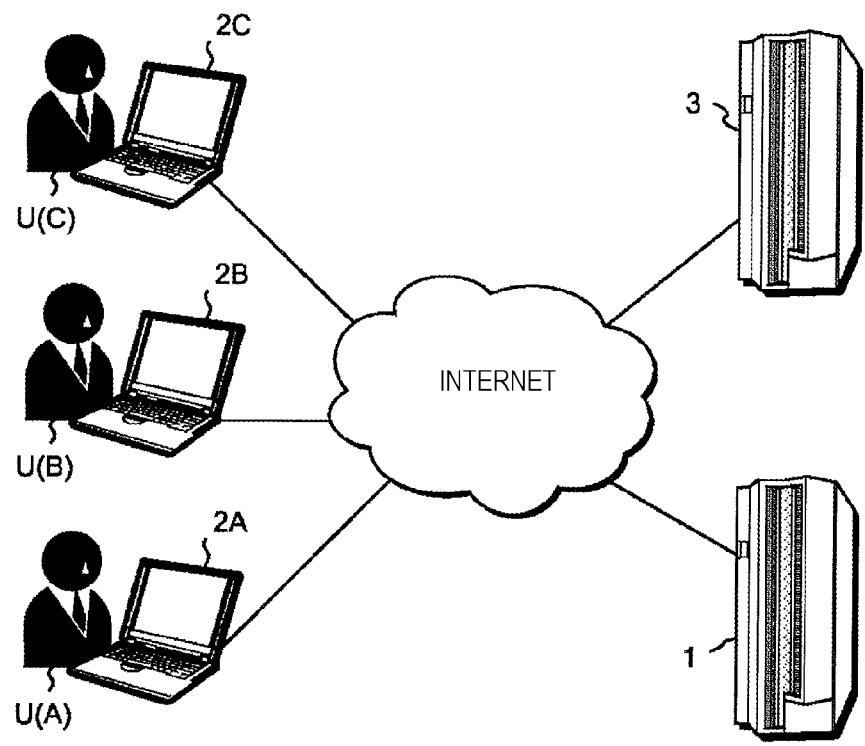
FIG. 1 is a conceptual view describing an embodiment of a network system (social accessibility system) and a scenario thereof.

FIG. 1 is a conceptual view describing an embodiment of a network system (social accessibility system) that includes computers to which the present invention is applied, and a scenario thereof. A configuration of the social accessibility system will be described. The system includes an accessibility server (computer system) 1, a user terminal 2A used by a metadata creator U(A), a user terminal 2B used by a metadata verifier U(B), and a user terminal 2C used by a metadata user (visually impaired person) U(C). As a prerequisite for this, a general web server 3 exists. These are communicatively connected with each other over the Internet.

Figure 2:
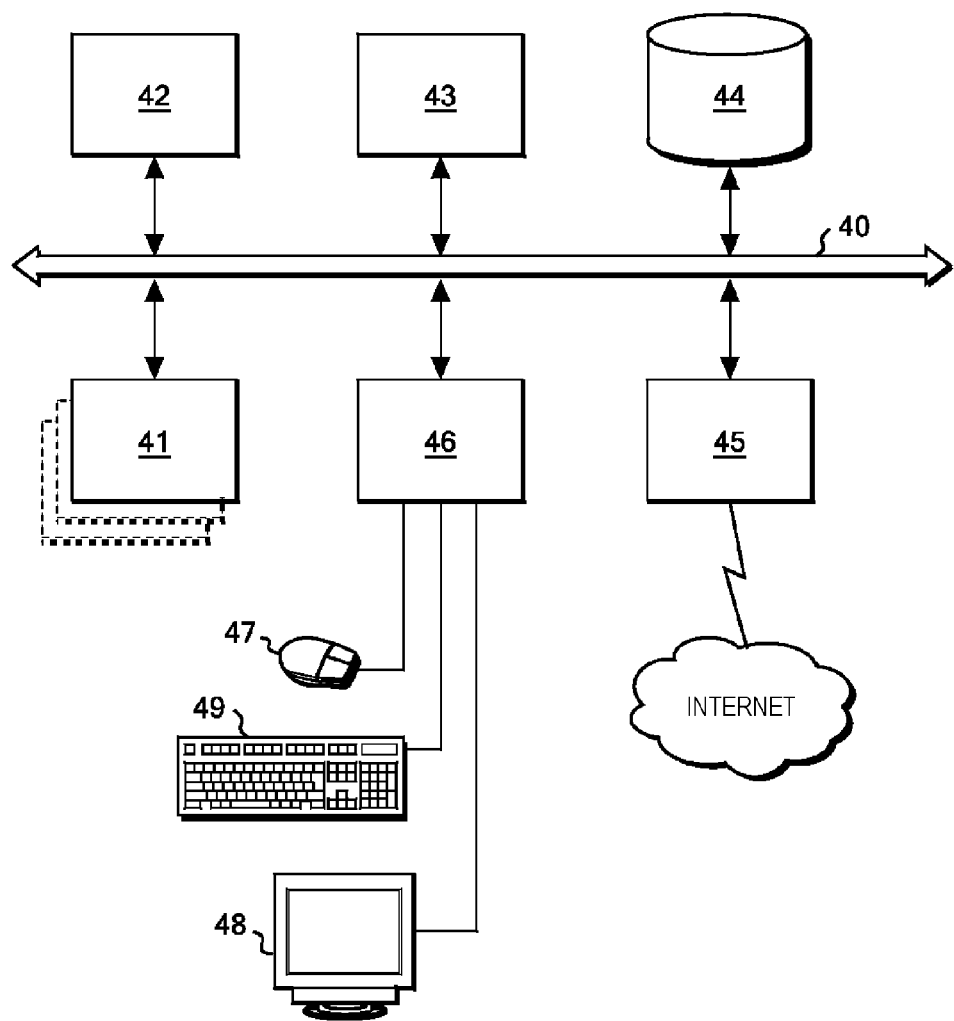
FIG. 2 is a diagram showing an exemplary hardware configuration of an information processing apparatus (computer) suitable for realizing an accessibility server 1.

FIG. 2 is a diagram showing an exemplary hardware configuration of an information processing apparatus (computer) suitable for realizing the accessibility server 1. The information processing apparatus includes a main CPU (Central Processing Unit: calculation processing means) 41 and a main memory (storage means) 42, which are connected to a bus 40. In addition to a hard disk device (storage means) 44, removable storage (external storage systems capable of changing a recording medium) such as a CD-ROM device, a flexible disk device, an MO device, and a DVD device (not shown) is connected to the bus 40 via a floppy disk controller, an IDE controller, a SCSI controller, and the like.

Storage media such as a flexible disk, an MO, a CD-ROM, and a DVD-ROM are inserted into the removable storage. These storage media, the hard disk device 44, and a ROM 43 can record code of a computer program for providing instructions to the CPU and the like in cooperation with an operating system to thereby implement the present invention. The computer program is loaded into the main memory 42 to be executed. The computer program can also be compressed or divided into pieces to be recorded on a plurality of media.

The information processing apparatus receives inputs from input devices (I/O means) such as a keyboard 49 and a mouse 47 via a keyboard/mouse controller 46. The information processing apparatus is connected, via a DAC/LCDC, to a display device (I/O means) 48 for presenting visual data to a user.

The information processing apparatus can connect to a network via a network adaptor (communication means) 45 (an ETHERNET™ card or a token ring card) or the like and communicate with other devices such as computers. (ETHERNET is a trademark of Xerox Corporation in the United States and/or other countries.) Although not shown, a printer can be connected with the information processing apparatus via a parallel port, and a modem can be connected to the information processing apparatus via a serial port.

FIG. 3 is a functional block diagram describing part of software functions of the accessibility server 1. The accessibility server 1 includes an operation system 10 providing basic functions, a web browser 11, a crawler 12 crawling information in the web server 3, an accessibility score calculation module 13, an effect-prediction similarity calculation module 14, an effect-verification similarity calculation module 15, a corrected-page recommender 16, a metadata extension recommender 17, and a verified-page recommender 18. Functions may be allocated to these components in any manner, so that several functions may be integrated in a single component or a single function may be divided among several components. Each component shown in the functional block diagram of FIG. 3 can be realized in an information processing apparatus having the hardware configuration described using FIG. 2 in such a manner that computer programs (such as an operating system, middleware, and application programs) stored in the hard disk device 44 or the like are loaded into the main memory 42 and read by the main CPU 41 to cause hardware resources and software to cooperate.

FIG. 4 describes part of data maintained in the accessibility server 1. The accessibility server 1 includes a DOM data server 19A and a metadata server 19B, which store DOM data and metadata (corrections) as illustrated, respectively. Here, the metadata includes a type indicating how to correct an accessibility error (defect), such as adding a heading or adding alternative text. In addition, the metadata includes a URI pattern indicating to which piece of DOM the metadata is applied, and a pointer indicating to which element in the DOM the metadata is applied. The URI pattern is expressed in a form such as a URI or regular expression that includes a wild card, and the pointer is expressed in a form such as XPath or a URI (including a wild card or a regular expression) for pointing to an image. The following are examples.

Example 1

Type: add a heading
URI pattern: http://www.example.com/*
XPath: /HTML/BODY/DIV[2]/DIV[1]

Example 2

Type: empty alternative text
URI pattern: http://www.example.net/*
Image URI: http://www.example.net/images/*.jpg An accessibility error (defect) is, for example, an error that prevents a person such as a visually impaired person from aurally accessing web content, such as a lack of alternative text, and generally a plurality of errors are detected in each page. Each error has predetermined points, which are subtracted from an accessibility score (the degree of defect) if the error is detected. There are errors that have a location (XPath) identified in DOM and errors that do not. For each error item, DOM may include a plurality of former type of errors but never includes a plurality of latter type of errors. When two errors are identical, it means that the error type matches, and the location in DOM also matches if it can be identified.

FIG. 5 is a functional block diagram describing part of software functions of each of the user terminals 2A to C. The user terminals 2A to C commonly include operation systems 20A to C providing basic functions, and web browsers 21A to C. In addition, the user terminal 2A used by the metadata creator U(A) includes a metadata edit tool 22A and a metadata-extension verification and edit tool 23A. The user terminal 2B used by the metadata verifier U(B) includes a metadata verification tool 22B. Furthermore, the user terminal 2C used by the metadata user U(C) includes a screen reader 22C. Functions may be allocated to these components in any manner, so that several functions may be integrated in a single component or a single function may be divided among several components. Although this embodiment is described by assuming the user terminals 2 as notebook personal computers, various types of information processing apparatuses may be employed as the user terminals 2, including a PDA (Personal Digital Assistant), a desktop personal computer, and a smart phone. As an example, if the user terminals 2 are notebook or desktop personal computers, an operating system such as MICROSOFT™ WINDOWS™ and a standard web browser such as INTERNET EXPLORER™ or FIREFOX™ may be installed. (MICROSOFT, WINDOWS, and INTERNET EXPLORER are trademarks of Microsoft Corporation in the United States and/or other countries. FIREFOX is a trademark of The Mozilla Foundation in the United States and/or other countries.)

Figure 6:
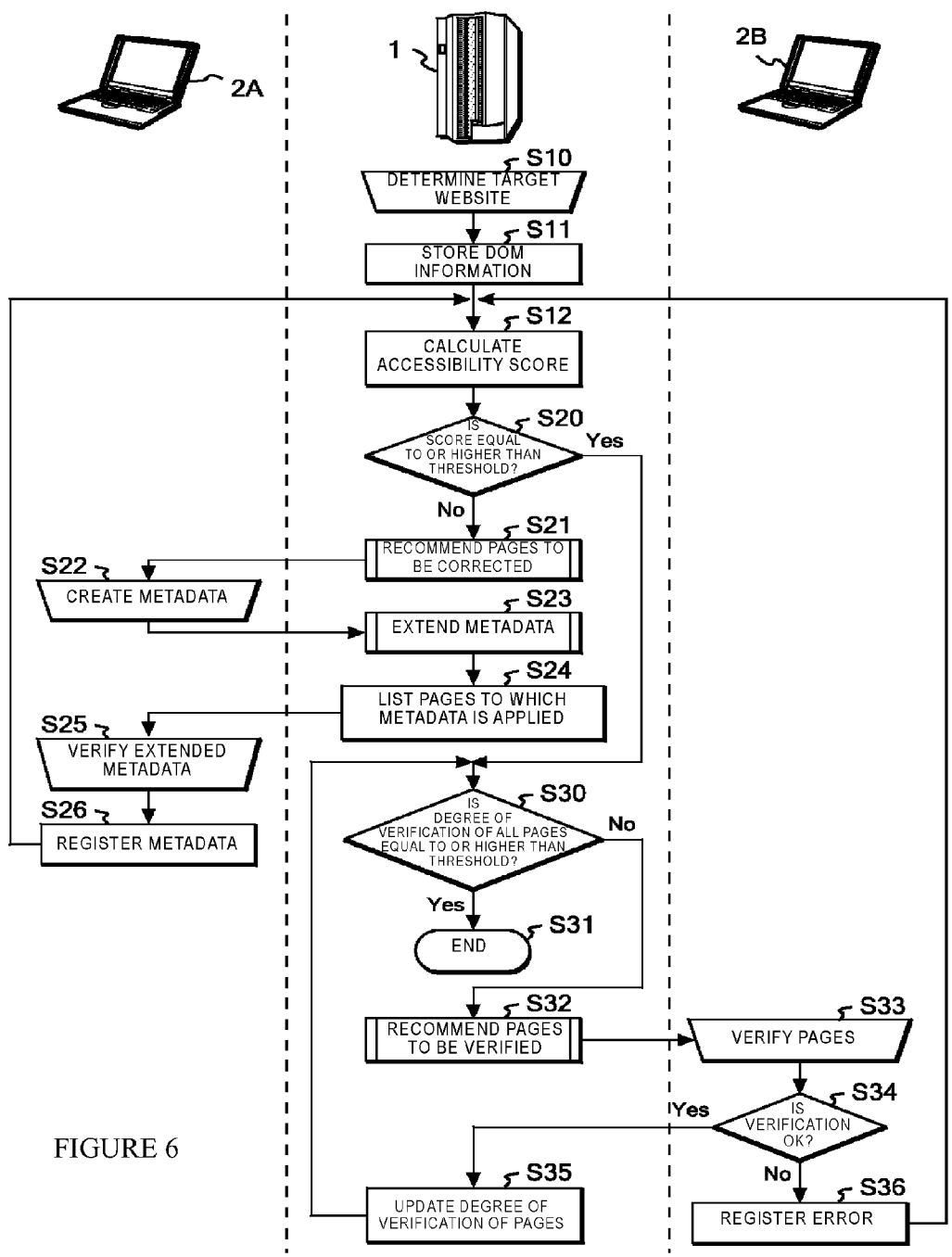
FIG. 6 is a basic flowchart describing a process in which the accessibility server 1 aids in creating, extending, and verifying metadata.
Figure 7:
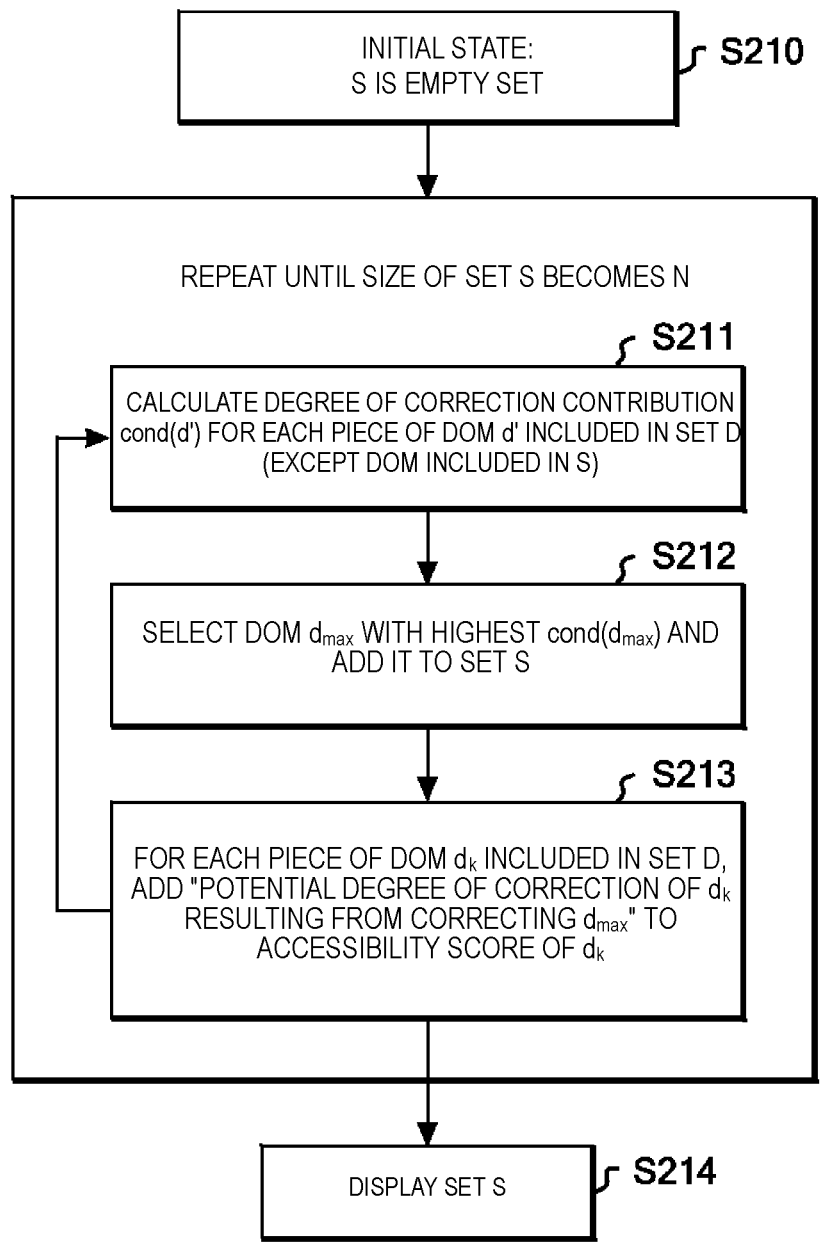
FIG. 7 is a flowchart describing in more detail a process of recommending pages to be corrected.
Figure 9:
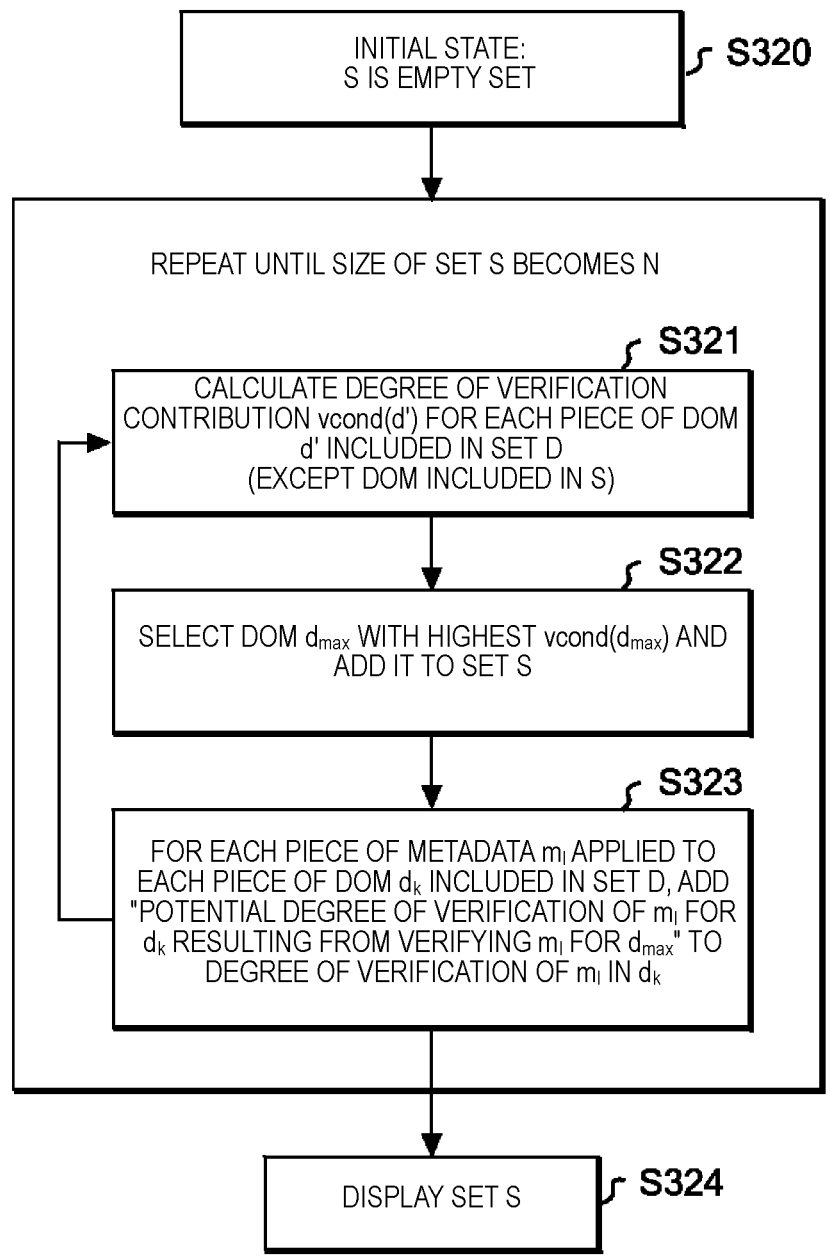
FIG. 9 is a flowchart describing in more detail a process of recommending pages to be verified.

FIG. 6 is a basic flowchart describing a process in which the accessibility server 1 aids in creating, extending, and verifying metadata. FIGS. 7, 8, and 9 are flowcharts describing in more detail a process of recommending pages to be corrected (S21), a process of extending the metadata (S23), and a process of recommending pages to be verified (S32), respectively. According to these charts, various aiding functions of the accessibility server 1 will be described below.

Here, ranges, names, and meanings of functions will be defined. Description of ssim and psim will be made later. As the degree of similarity of DOM, a value can be used that results from normalizing the degree of similarity using edit distance, which is an existing technique, or the degree of similarity of layout distance or the like calculated in the technique of the Published Unexamined Patent Application No. 2003-85087 for layout-based classification.

the degree of similarity between DOM d and d': $0 \leq \text{dsim}(d,d') \leq 1$ the accessibility score of DOM d: $0 \leq \text{as}(d) \leq 1$ the error score of DOM d: $\text{es}(d) = 1 - \text{as}(d)$ an element set to which metadata m is applied in DOM d: elems(d,m)

an element set identified by an error (problem) p in DOM d: elems(d,p)

a style (appearance) defined for an element set E and the number of times thereof: style(E)

the degree of similarity between styles (appearances) s and s': $0 \leq \text{ssim}(s,s') \leq 1$ the degree of similarity of problem points in DOM d and d': $0 \leq \text{psim}(d,d') \leq 1$ First, a target website is determined (S10). For example, the website may be determined at the request of the metadata user U(C). Next, the crawler 12 accesses the relevant web server 3 and stores DOM information about the website in the DOM data server 19A (S11). Next, the accessibility score calculation module 13 applies metadata stored in the metadata server 19B to a copy of the stored DOM data and calculates the accessibility score of the website (S12). If the score does not reach a preset threshold, the corrected-page recommender 16 uses the degree of effect-prediction similarity to present and recommend, on the user terminal 2A used by the metadata creator U(A), top N pages for which metadata should be created (S20, S21). Once the metadata creator U(A) creates metadata (S22), the metadata extension recommender 17 automatically extends the metadata throughout the website (S23). Next, the verified-page recommender 18 uses the degree of effect-verification similarity to list, in order of similarity, pages to which the metadata is applied (S24). The metadata creator U(A) uses the metadata-extension verification and edit tool 23A to verify whether or not the metadata extension is appropriate (S25) and registers the appropriate metadata in the metadata server 19B (S26).

On the other hand, if the accessibility score is equal to or higher than the preset threshold, in order that the degree of verification for all pages may further be equal to or higher than a threshold (S30), the verified-page recommender 18 uses the degree of effect-verification similarity to present and recommend, on the user terminal 2B used by the metadata verifier U(B), top N pages to be verified (S32). The metadata verifier U(B) verifies the metadata with the metadata verification tool (S33). If the verification results in OK, the degree of verification for the pages is updated (S35). Otherwise, an error is registered (S36).

Now, functions of each module will be described below.

The score calculated by the accessibility score calculation module 13 takes a real number value between 0 and 1, where 1 is the full score. If metadata is already created, the accessibility score is calculated for content with the metadata applied thereto. The score is obtained by subtracting points of detected errors. Points of an error are predetermined according to the seriousness of the error and the like. For example, points of an error of a lack of alternative text can be predetermined as 0.01. The accessibility score calculation module 13 may recalculate the accessibility score of each piece of content each time new metadata is accumulated in the metadata server 19B, or this calculation may be delayed until required in order to reduce the amount of calculation.

The effect-prediction similarity calculation module calculates, between DOM d and d', a value indicating to which degree errors in DOM d' will be corrected if errors in DOM d are corrected. When error points in d are completely corrected, it is considered that the errors in d' will also be completely corrected if the error points are identical between d and d', whereas the errors in d' will be half corrected if the error points are half similar between d and d'. That is, the degree of similarity psim(d,d') of error points in DOM d and d' is calculated. Here, psim(d,d') can be calculated by an equation (2), where P(d) is a set of errors in DOM d, s(p) is a subtracted score due to an error p, and k(d,d',p) is the degree of similarity indicating how much the error p is similar between DOM d and d'. This value indicates how much the errors are similar with respect to all errors in d and d', where the value is 1 if the errors are all identical, whereas 0 if the errors are all different. The denominator is the sum of the scores of all errors, and the numerator is the sum of the scores of common errors multiplied by the degree of similarity between the errors.

The degree of similarity k(d,d',p) of an error is calculated as follows depending on the type of the error p. If the error p identifies a location in DOM, for example in the case of a lack of alternative text, inappropriate alternative text, or a collapsed link in a page, the degree of similarity of the error detected at the same location is estimated as the degree of similarity of style (appearance). That is, it can be considered that k(d,d',p)=ssim(elems(d,p), elems(d',p)). On the other hand, if the error p does not specify a location in DOM, for example in the case of a lack of a title, the degree of similarity of the error is estimated as the degree of similarity of DOM. That is, it can be considered that k(d,d',p)=dsim(d,d').

Figure 11:
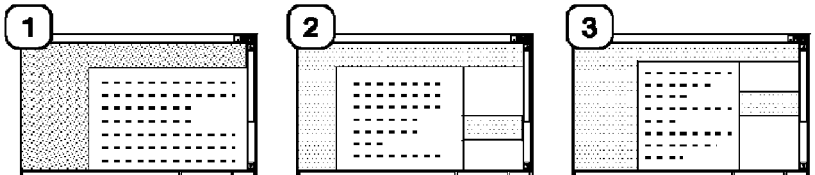
FIG. 11 is a diagram showing a specific example of calculating psim(d,d')

The degree of similarity of style (appearance) ssim(s,s') is defined by an equation indicated as an equation (4), where s=style(E) is a function of a property p and a value v of a style (appearance) in the element set E, and s(p,v) denotes the number of times the value v appears for the property p. Information about style (appearance) may include style in CSS, as well as information such as the element size and a URL of an image used. Wp denotes the degree of influence of the property p on the degree of similarity of style. For example, a weight on the font size may be increased. The value of ssim(s,s') indicates how much properties p included in styles s and s' are similar, where the value is 1 if the properties are all identical, and 0 if the properties are all different. FIG. 10 shows a specific example of calculating ssim(s,s'), and FIG. 11 shows a specific example of calculating psim(d,d').

The effect-verification similarity calculation module 15 calculates a value conf(m,d,d') with an equation (6). This value indicates to which degree metadata m can be considered verifiable for another page d' by verifying the metadata m applicable to one page d. This value may also be regarded as a value indicating how reliably metadata m can be reused in another page d' if the metadata m created for one page d is automatically extended throughout the website. Here, if metadata m is verified for DOM d, the metadata m is considered verifiable with a certain degree of confidence for DOM similar to d and for elements similar in appearance. If m cannot be applied to d', then conf(m,d,d')=0. The equation (6) is expressed as a product of the degree of similarity of style (appearance) of elements to which metadata is applied and the degree of similarity of DOM.

Now, the recommendation of pages to be corrected (S21), the extension of metadata (S23), and the recommendation of pages to be verified (S32) will be described in more detail below.

Recommendation of Pages to be Corrected

Based on an output result of the effect-prediction similarity calculation module 14, the corrected-page recommender 16 orderly lists DOM candidates estimated to be most effectively corrected. The corrected-page recommender 16 calculates the degree of correction contribution cont(d) for DOM d with the equation (1). FIG. 7 is a flow in which the corrected-page recommender 16 selects N correction candidates. First, the process starts with a set S of correction candidate DOM being empty (S210). Next, the degree of correction contribution is calculated for each piece of DOM (S211). Next, DOM dmax with the highest degree of correction contribution is added to the correction candidates S (S212). Next, on the assumption that dmax has been corrected, a potential degree of correction to which other pieces of DOM dk will be corrected as a result of correcting dmax is added to the accessibility score as(dk) of dk (S213). The calculation here is done by considering that the potential degree of correction=psim(dmax,dk)*es(dk).

Here, since the accessibility score as(d) (the error score es(d)=1−as(d)) is updated, the accessibility score of DOM similar to dmax added to the correction candidates increases. Therefore, DOM dissimilar to the DOM selected first will be selected next. This is repeated until the size of the set S becomes N. During the repetition, if all error scores become smaller than a predetermined value or if all pieces of DOM are added to S, the process is terminated at that point. The metadata creator can view the calculated correction candidate pages in a list display that includes the URL, title, thumbnail, and the like of each page.

FIG. 12 shows an example of calculating the degree of correction contribution and selecting the correction candidates. It is assumed that five pages (a to e) exist and the degree of similarity psim of problem points of the pages is calculated as shown. It is to be noted that the degree of similarity is in a symmetric fashion. The error score and the degree of correction contribution cond in the initial state are calculated as shown. Here, the page a is added to the correction candidates S. On the assumption that all problems in the page a have been corrected, the updated error score and degree of contribution correction are calculated as shown. As a result, the page c is added to the correction candidates next.

Extension of Metadata

The metadata extension recommender 17 calculates whether metadata created for one page can be applied to other pages based on values calculated by the effect-verification similarity calculation module 15, and estimates locations (elements and pages) to which the metadata can be extended. The estimated elements and pages can be presented through a metadata edit interface on the user terminal 2A used by the metadata creator U(A). Alternatively, the extension estimated here can be automatically applied without being presented to the metadata creator U(A), and the metadata creator U(A) can later verify the result of the extension through the verified-page recommender.

FIG. 8 is flows in which the metadata extension recommender 17 performs the metadata extension, where FIG. 8($a$) shows metadata extension within a page and FIG. 8($b$) shows metadata extension between pages. That is, the metadata extension within a page is performed as follows. In response to creation of metadata by the metadata creator U(A) (S230), metadata having the same data within a page is selected (S231). Next, XPath of the pieces of metadata is generalized to select analogized elements (S232). Furthermore, elements are further narrowed down from the selected elements by using the degree of effect-verification similarity and a preset threshold (S233). The metadata extension between pages is performed as follows. In response to creation of metadata by the metadata creator U(A) (S235), another page for which XPath of a piece of metadata can be verified is selected (S236). Next, elements to which the piece of metadata is applied in the selected page are selected (S237). Furthermore, elements are narrowed down from the selected elements by using the degree of effect-verification similarity and a preset threshold (S238).

Figure 13:
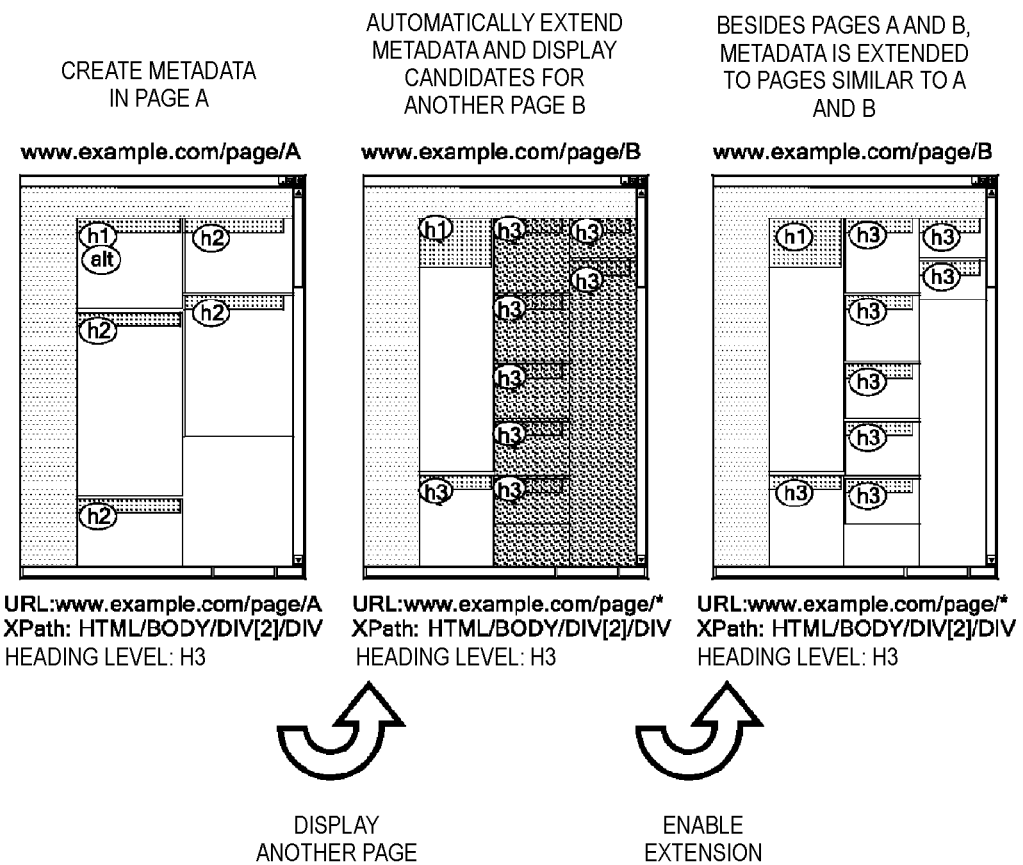
FIG. 13 is a diagram showing an example of a metadata-extension verification and edit tool.

FIG. 13 shows an example of the metadata-extension verification and edit tool 23A that presents the metadata extension to the metadata creator U(A). Here, the extension between pages is performed. The metadata creator first creates metadata (displayed as "h2" here, for example) in a page A. The system performs estimation from the metadata and displays candidates (indicated as a plurality of "h3" in shaded portions) in another page B. When the metadata creator U(A) enables extension for the candidates (the shaded portions turn to white portions to indicate that the candidates are enabled), the metadata is extended to similar pages in addition to the pages A and B.

Recommendation of Pages to be Verified

Figure 14:
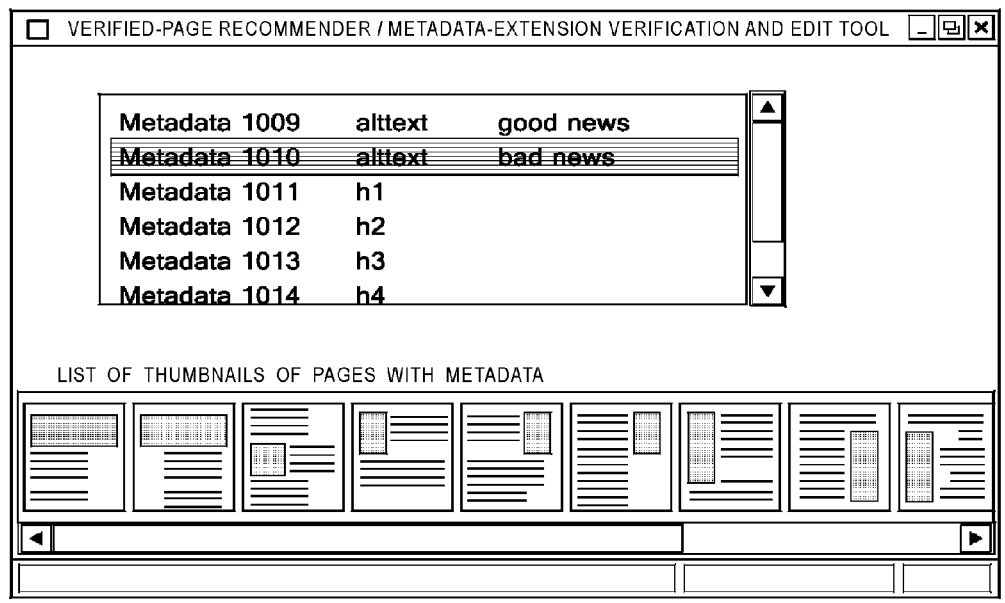
FIG. 14 is a diagram showing another example of the metadata-extension verification and edit tool.

Based on values calculated by the effect-verification similarity calculation module 15, the verified-page recommender 18 lists pages to be verified for the correctness of extended metadata, and presents the list on the user terminal 2B used by the metadata verifier U(B). For example, as in FIG. 14, DOM can be sorted and displayed in ascending order of the degree of effect-verification similarity. This allows the metadata verifier U(B) to readily know DOM having a low degree of similarity, that is, DOM in which metadata is likely to be inappropriately reused, and to actually display and check such a page. At this point, if the metadata verifier U(B) performs an operation of excluding such a page from the metadata extension, the system can automatically modify the wild card of the URL.

Also, based on verification of a piece of DOM, the degree of verification of similar DOM is estimated. DOM with a high degree of verification is considered as being analogically sufficiently verified, and this allows efficient verification. This calculation is performed by using the degree of verification contribution, and as in the case of the degree of correction contribution, the calculation is performed repeatedly to determine a plurality of pages to be verified. The degree of verification indicating to which degree metadata m has been verified in DOM d is denoted by V(d,m), which is initially set to 0. The degrees of verification of pieces of metadata in a page verified by the metadata verifier U(B) in the past are all 1. The degree to which the verification is not performed yet, that is, the degree of non-verification NV(d,m) is defined as 1−V(d,m). A potential degree of verification V(d) of the entire DOM d is defined as V(d)=SigmafV(d,m)1/N(M(d)), where M(d) is metadata applicable to d, and N(M(d)) is the number of pieces of metadata included in M(d). The degree of verification contribution vcond(d) when DOM d is verified is defined as the equation (7).

FIG. 9 is a flow in which the verified-page recommender 18 selects N verification candidates. First, the process starts with a set S of verification candidate DOM being empty (S320). Next, the degree of verification contribution is calculated for each piece of DOM (S321). Next, DOM dmax with the highest degree of verification contribution is added to the verification candidates S (S322). Next, on the assumption that metadata m1 applied to dmax has been verified, a potential degree of verification to which the metadata m1 in other pieces of DOM dk will be verified as a result of verifying dmax is added to the degree of verification V(dk,m1) of metadata applied to dk (S323). Here, the potential degree of verification=conf(m1,dk,dmax)*NV(dk,m1). Since the degrees of verification V(d,m) and V(d) (the degrees of non-verification NV(d,m)=1−V(d,m), NV(d)=1−V(d)) are updated, the degree of verification of DOM similar to dmax added to the verification candidates S increases. Therefore, DOM dissimilar to the DOM selected first will be selected next. This is repeated until the size of the set S becomes N. During the repetition, if all degrees of verification become larger than a predetermined value or if all pieces of DOM are added to S, the process is terminated at that point.

Thus the best mode for implementing the present invention has been described in detail based on the drawings. In summary, the present invention is methods by which degrees of similarity between pages from the viewpoint of metadata creation and verification can be estimated based on degrees of similarity between pages in terms of structure, style (appearance), and accessibility error, and based on the estimation, representative pages appropriate for efficiently adding the metadata can be recommended, or target pages appropriate for efficiently verifying the metadata can be recommended. Here, the degrees of similarity between pages are roughly divided into two types: the degree of similarity for the prediction of effect of metadata performed for creating metadata (the degree of effect-prediction similarity), and the degree of similarity for the verification of effect performed after creating the metadata (the degree of effect-verification similarity).

The degree of effect-prediction similarity is determined in the following procedure. 1. A website is crawled in advance to obtain DOM of pages. 2. For each page, accessibility errors are listed and an accessibility score is calculated. 3. Between two pages, the degree of similarity of the accessibility errors and the degree of similarity of the structure of the DOM of the pages are calculated, based on which the degree of effect-prediction similarity is calculated. Based on the degree of effect-prediction similarity, on the assumption that effect of metadata created for one page propagates according to the degree of similarity, top N pages estimated to provide high effect of creating the metadata can be presented to the metadata creator.

The degree of effect-verification similarity is determined in the following procedure. 1. DOM is listed to which created metadata is applied. 2. Elements to which the metadata is applied in each piece of DOM are listed, and style information is extracted. 3. Between two pages, the degree of effect-verification similarity is determined from the degree of similarity of the extracted style and the degree of similarity of the structure of the DOM. Based on the degree of effect-verification similarity, on the assumption that the degree of verification of metadata verified for one page propagates according to the degree of similarity, top N pages estimated to provide high effect of verifying the pages can be presented to a page verifier. Also, pages to which a piece of metadata is applied are listed in order of the degree of similarity, so that it can be verified whether the piece of metadata is not inappropriately applied.

The present invention can be implemented as methods, as well as hardware, software, or a combination of hardware and software. A typical example of implementation as a combination of hardware and software may be implementation in a data processing system having a predetermined program that, when loaded and executed in the data processing system, controls the data processing system to cause it to carry out processing according to the present invention. This program includes a set of instructions that can be expressed in any language, code, or notation. Such a set of instructions is intended to allow the system to perform a particular function, either directly or after 1) conversion to another language, code, or notation, and/or 2) reproduction in another medium.

It is to be understood that the present invention covers such a program itself as well as a medium having recorded the program thereon. The program for carrying out functions of the present invention can be stored in any computer-readable recording media, such as a flexible disk, MO, CD-ROM, DVD, hard disk device, ROM, MRAM, and RAM. The program can be downloaded from another data processing system connected via a communication line or reproduced from another recording medium, for storage on a recording medium. The program can also be compressed or divided into pieces to be stored on one or more recording media. It is also to be noted that program products implementing the present invention can certainly be provided in various forms.

The invention claimed is:

1. A program product for aiding in correcting defects included in structured text, wherein the program product comprises a non-transitory storage medium storing a program that, when executed by a computer, causes the computer to perform:

calculating a degree of defect for each of the defects;
calculating a degree of similarity for each of the defects;
calculating, based on the degree of defect and the degree of similarity, a degree of contribution indicating a degree to which correction of each of the defects influences correction of remaining defects, wherein the structured text defined by a Document Object Model (DOM), and the degree of contribution cont(d) is calculated by an equation (1):

[Expression 1]

$$cont(d) = \sum_{d' \in D} psim(d,d') \cdot es(d') \qquad \text{(Equation 1)}$$

where cont(d) is the degree of correction contribution indicating the degree to which the correction of each of the defects in a page denoted by DOM d' influences defects in a page denoted by DOM d, psim(d,d') is the degree of similarity between each of the defects included in the page denoted by DOM d and each of the defects included in the page denoted by DOM d', es(d') is the degree of defect of the page denoted by DOM d', and D is a set of DOM in target HTML text; and selecting a defect having a high degree of contribution as a higher-priority defect.

2. The program product according to claim 1, wherein the program that, when executed by the computer, causes the computer to perform:

recalculating the degree of defect for each of the remaining defects on the assumption that the selected defect has been corrected;

recalculating the degree of contribution for the remaining defects based on the recalculated degree of defect and the degree of similarity; and selecting another defect having a high degree of contribution among the remaining defects as a next higher-priority defect.

3. The program product according to claim 2, wherein a correction order of the defects is determined by recursively repeating the recalculating and the selecting.

4. The program product according to claim 1, wherein the defects are defects in each page included in the structured text.

5. The program product according to claim 1, wherein the degree of similarity psim(d,d') is calculated by an equation (2):

[Expression 2]

$$psim(d, d') = \frac{\sum_{p \in P(d) \cap P(d')} s(p) \cdot k(d, d', p)}{\sum_{p \in P(d) \cup P(d')} s(p)} \qquad \text{(Equation 2)}$$

where

P(d) and P(d') are sets of the defects included in the page denoted by DOM d and the page denoted by DOM d', respectively, s(p) is a degree of defect due to a defect p, and k(d,d',p) is a degree of similarity indicating to which degree the defect p is similar between the page denoted by DOM d and the page denoted by DOM d'.

6. The program product according to claim 5, wherein on a condition that the defect p is a defect having a location identifiable in DOM, the degree of similarity k(d,d',p) is calculated by an equation (3):

$$k(d,d',p) = ssim(elems(d,p), elems(d',p)) \qquad \text{(Equation 3)}$$

where elems(d,p) and elems(d',p) are element sets identified by the defect p in the page denoted by DOM d and the page denoted by DOM d', respectively, s=s(elems(d,p)) and s'=s(elems(d',p)) are styles of the element sets elems(d,p) and elems(d',p), respectively, and ssim(s,s') is a degree of style similarity indicating a degree of similarity between the styles.

7. The program product according to claim 6, wherein the degree of style similarity ssim(s,s') is calculated by an equation (4):

[Expression 4]

$$ssim(s, s') = \sum_{p \in s \cap s'} Wa \frac{\sum_v s(a,v) - s'(a,v)}{\left(\sqrt{\sum_v s(a,v)^2}\right) \cdot \left(\sqrt{\sum_v s'(a,v)^2}\right)} \quad \text{(Equation 4)}$$

where $$\sum_a Wa = 1$$

where
the style s is a function s(a,v) of a property a and a value v of the style, and
Wa is a weight indicating a degree to which the property a influences the degree of style similarity.

8. The program product according to claim 5, wherein
if the defect p is a defect not having a location identifiable in DOM,
the degree of similarity k(d,d',p) is calculated by an equation (5):

$$k(d,d',p) = dsim(d,d') \quad \text{(Equation 5)}$$

where
dsim(d,d') is a degree of similarity between DOM d and DOM d'.

9. A program product for aiding in correcting defects included in structured text, wherein the program product comprises a non-transitory storage medium storing a program that, when executed by a computer, causes the computer to perform:
receiving an input of a correction for a defect;
calculating a degree of similarity between the defect and remaining defects;
calculating, based on the degree of similarity, a degree of confidence indicating a degree as to whether or not the correction is applicable to the remaining defects, wherein the structured text is HTML text defined by Document Object Model (DOM), and the degree of confidence conf(m,d,d') is calculated by an equation (1):

$$conf(m,d,d') = ssim(elems(d,m), elems(cr,m)) \cdot dsim(d,d') \quad \text{(Equation 1)}$$

where
conf(m,d,d') is a degree of confidence indicating a degree as to whether or not a correction m for a defect included in a page denoted by DOM d is also applicable to a defect in a page denoted by DOM d',
dsim(d,d') is a degree of similarity between the page denoted by DOM d and the page denoted by DOM d',
elems(d,m) and elems(d',m) are element sets identified by the correction m in the page denoted by DOM d and the page denoted by DOM d', respectively,
s=s(elems(d,m)) and s'=s(elems(d',m)) are styles of the element sets elems(d,m) and elems(d',m), respectively, and
ssim(s,s') is a degree of similarity between the styles; and
selecting the correction as a correction candidate for defects having the degree of confidence equal to or higher than a threshold.

10. The program product according to claim 9, wherein the remaining defects are defects across pages included in the structured text.

11. The program product according to claim 9, wherein the remaining defects are defects within a page included in the structured text.

12. A program product for aiding in verifying corrections included in structured text, wherein the program product comprises a non-transitory storage medium storing a program that, when executed by a computer, causes the computer to perform:
calculating a degree of verification indicating a degree to which each of the corrections have been verified;
calculating a degree of similarity for the corrections;
calculating, based on the degree of similarity, a degree of verification contribution indicating a degree to which verification of a correction influences verification of the remaining corrections, wherein the structured text is HTML text defined by a Document Object Model (DOM), and the degree of verification contribution vcond(d) is calculated by an equation (1):

[Expression 7]

$$vcond(d) = \sum_{d' \in D} \{\Sigma conf(m, d', d) \cdot (1 - v(d', m))\} \quad \text{(Equation 7)}$$

where
D is a set of target DOM,
v(d',m) is a degree of verification indicating a degree to which a correction m included in a page denoted by DOM d' has been verified, and
conf(m,d',d) is a degree of confidence indicating a degree as to whether or not the correction m included in the page denoted by DOM d' is also applicable to a defect in a page denoted by DOM d; and
selecting a correction having a high degree of verification contribution as a higher-priority correction.

13. The program product according to claim 12, wherein the program that, when executed by the computer, causes the computer to perform:
recalculating the degree of verification for each remaining correction on the assumption that the selected correction has been verified;
recalculating the degree of verification contribution for the remaining corrections based on the recalculated degree of verification and the degree of similarity; and
selecting another correction having a high degree of verification contribution among the remaining corrections as a next higher-priority correction.

14. The program product according to claim 13, wherein a verification order of the corrections is determined by recursively repeating the recalculating and the selecting.

15. The program product according to claim 13, wherein
the structured text is HTML text defined by a Document Object Model (DOM), and on the assumption that a correction m included in a page denoted by DOM d' has been verified,
the recalculated degree of verification v'(d,m) is calculated by an equation (2):

$$v'(d,m) = v(d,m) + conf(m,d,d) N \cdot v(d,m) \quad \text{(Equation 2)}$$

where
v(d,m) is a degree of verification indicating a degree to which the correction m included in a page denoted by DOM d has been verified, and
conf(m,d,d') is a degree of confidence indicating a degree as to whether or not the correction m included in the page denoted by DOM d is also applicable to a defect in the page denoted by DOM d'.

16. A method implemented by a computer system, the method aiding in correcting defects included in structured text, comprising:
calculating a degree of defect for each of the defects;
calculating a degree of similarity for each of the defects;
calculating, based on the degree of defect and the degree of similarity, a degree of contribution indicating a degree to which correction of each of the defects influences correction of remaining defects, wherein the structured text defined by a Document Object Model (DOM), and the degree of contribution cont(d) is calculated by an equation (1):

[Expression 1]

$$cont(d) = \sum_{d' \in D} psim(dd') \cdot es(d') \quad \text{(Equation 1)}$$

where
cont(d) is the degree of correction contribution indicating the degree to which the correction of each of the defects in a page denoted by DOM d' influences defects in a page denoted by DOM d,
psim(d,d') is the degree of similarity between each of the defects included in the page denoted by DOM d and each of the defects included in the page denoted by DOM d',
es(d') is the degree of defect of the page denoted by DOM d', and
D is a set of DOM in target HTML text; and
selecting a defect having a high degree of contribution as a higher-priority defect.

17. A method implemented by a computer system, the method aiding in correcting defects included in structured text, comprising:
receiving an input of a correction for a defect;
calculating a degree of similarity between the defect and remaining defects;
calculating, based on the degree of similarity, a degree of confidence indicating a degree as to whether or not the correction is applicable to the remaining defects, wherein the structured text is HTML text defined by Document Object Model (DOM), and the degree of confidence conf(m,d,d') is calculated by an equation (1):

conf(m,d,d')=ssim(elems(d,m),elems(d',m))·dsim(d,d')   (Equation 1)

where
conf(m,d,d') is a degree of confidence indicating a degree as to whether or not a correction m for a defect included in a page denoted by DOM d is also applicable to a defect in a page denoted by DOM d',
dsim(d,d') is a degree of similarity between the page denoted by DOM d and the page denoted by DOM d',
elems(d,m) and elems(d',m) are element sets identified by the correction m in the page denoted by DOM d and the page denoted by DOM d', respectively,
s=s(elems(d,m)) and s'=s(elems(d',m)) are styles of the element sets elems(d,m) and elems(d',m), respectively, and
ssim(s,s') is a degree of similarity between the styles; and
selecting the correction as a correction candidate for defects having the degree of confidence equal to or higher than a threshold.

18. A method implemented by a computer system, the method aiding in verifying corrections included in structured text, comprising:
calculating a degree of verification indicating a degree to which each of the corrections have been verified;
calculating a degree of similarity for the corrections;
calculating, based on the degree of similarity, a degree of verification contribution indicating a degree to which verification of a correction influences verification of the remaining corrections, wherein the structured text is HTML text defined by a Document Object Model (DOM), and the degree of verification contribution vcond(d) is calculated by an equation (1):

[Expression 7]

$$vcond(d) = \sum_{d' \in D} \{\Sigma conf(m, d', d) \cdot (1 - v(d', m))\} \quad \text{(Equation 7)}$$

where
D is a set of target DOM,
v(d',m) is a degree of verification indicating a degree to which a correction m included in a page denoted by DOM d' has been verified, and
conf(m,d',d) is a degree of confidence indicating a degree as to whether or not the correction m included in the page denoted by DOM d' is also applicable to a defect in a page denoted by DOM d; and
selecting a correction having a high degree of verification contribution as a higher-priority correction.

19. A computer system for aiding in correcting defects included in structured text, comprising:
storage; and
a processing unit coupled to the storage and that performs:
calculating a degree of defect for each of the defects;
calculating a degree of similarity for each of the defects;
calculating, based on the degree of defect and the degree of similarity, a degree of contribution indicating a degree to which correction of each of the defects influences correction of remaining defects, wherein the structured text defined by a Document Object Model (DOM), and the degree of contribution cont(d) is calculated by an equation (1):

[Expression 1]

$$cont(d) = \sum_{d' \in D} psim(dd') \cdot es(d') \quad \text{(Equation 1)}$$

where
cont(d) is the degree of correction contribution indicating the degree to which the correction of each of the defects in a page denoted by DOM d' influences defects in a page denoted by DOM d,
psim(d,d') is the degree of similarity between each of the defects included in the page denoted by DOM d and each of the defects included in the page denoted by DOM d',
es(d') is the degree of defect of the page denoted by DOM d', and
D is a set of DOM in target HTML text; and
selecting a defect having a high degree of contribution as a higher-priority defect.

20. A computer system for aiding in correcting defects included in structured text, comprising:
storage; and
a processing unit coupled to the storage and that performs:
receiving an input of a correction for a defect;

calculating a degree of similarity between the defect and remaining defects;

calculating, based on the degree of similarity, a degree of confidence indicating a degree as to whether or not the correction is applicable to the remaining defects, wherein the structured text is HTML text defined by Document Object Model (DOM), and the degree of confidence conf(m,d,d') is calculated by an equation (1):

$$\text{conf}(m,d,d') = \text{ssim}(\text{elems}(d,m), \text{elems}(d',m)) \cdot \text{dsim}(d,d') \quad \text{(Equation 1)}$$

where conf(m,d,d') is a degree of confidence indicating a degree as to whether or not a correction m for a defect included in a page denoted by DOM d is also applicable to a defect in a page denoted by DOM d', dsim(d,d') is a degree of similarity between the page denoted by DOM d and the page denoted by DOM d', elems(d,m) and elems(d',m) are element sets identified by the correction m in the page denoted by DOM d and the page denoted by DOM d', respectively, s=s(elems(d,m)) and s'=s(elems(d',m)) are styles of the element sets elems(d,m) and elems(d',m), respectively, and ssim(s,s') is a degree of similarity between the styles; and selecting the correction as a correction candidate for defects having the degree of confidence equal to or higher than a threshold.

21. A computer system for aiding in verifying corrections included in structured text, comprising:

storage; and a processing unit coupled to the storage and that performs:

calculating a degree of verification indicating a degree to which each of the corrections have been verified;

calculating a degree of similarity for the corrections;

calculating, based on the degree of similarity, a degree of verification contribution indicating a degree to which verification of a correction influences verification of the remaining corrections, wherein the structured text is HTML text defined by a Document Object Model (DOM), and the degree of verification contribution vcond(d) is calculated by an equation (1):

[Expression 7]

$$vcond(d) = \sum_{d' \in D} \{\Sigma \text{conf}(m, d', d) \cdot (1 - v(d', m))\} \quad \text{(Equation 7)}$$

where

D is a set of target DOM, v(d',m) is a degree of verification indicating a degree to which a correction m included in a page denoted by DOM d' has been verified, and conf(m,d',d) is a degree of confidence indicating a degree as to whether or not the correction m included in the page denoted by DOM d' is also applicable to a defect in a page denoted by DOM d; and selecting a correction having a high degree of verification contribution as a higher-priority correction.

\* \* \* \* \*